(12) United States Patent
Paul

(10) Patent No.: US 8,554,812 B1
(45) Date of Patent: Oct. 8, 2013

(54) METRIC-CONVERTER WATCH DEVICE

(71) Applicant: Harinder Paul, Yuba City, CA (US)

(72) Inventor: Harinder Paul, Yuba City, CA (US)

(*) Notice: Subject to any disclaimer, the term of this patent is extended or adjusted under 35 U.S.C. 154(b) by 0 days.

(21) Appl. No.: 13/746,766

(22) Filed: Jan. 22, 2013

Related U.S. Application Data

(63) Continuation-in-part of application No. 12/537,227, filed on Aug. 6, 2009, now Pat. No. 8,386,542.

(51) Int. Cl.
*G04G 9/00* (2006.01)
*G06F 3/02* (2006.01)

(52) U.S. Cl.
USPC ............................ 708/111; 708/130; 345/169

(58) Field of Classification Search
None
See application file for complete search history.

(56) References Cited

U.S. PATENT DOCUMENTS

| | | | |
|---|---|---|---|
| 3,928,960 A * | 12/1975 | Reese | 708/111 |
| D243,751 S | 3/1977 | Price et al. | |
| 4,041,295 A | 8/1977 | Ido et al. | |
| 4,093,992 A | 6/1978 | Kawamura et al. | |
| 4,109,315 A | 8/1978 | Pan | |
| D249,243 S | 9/1978 | Salter | |
| 4,141,074 A | 2/1979 | Popper | |
| 4,158,285 A | 6/1979 | Heinsen et al. | |
| 4,228,516 A | 10/1980 | Johnston, Sr. | |
| D263,376 S | 3/1982 | Saito | |
| 4,686,643 A * | 8/1987 | Ishiwata | 708/206 |
| 5,050,138 A * | 9/1991 | Yamada et al. | 368/10 |
| 5,265,009 A | 11/1993 | Colavita | |
| 6,560,165 B1 * | 5/2003 | Barker | 368/10 |
| 7,136,138 B1 | 11/2006 | Sekiguchi et al. | |
| 2006/0140063 A1 | 6/2006 | Galie | |
| 2006/0183505 A1 * | 8/2006 | Willrich | 455/566 |
| 2010/0060664 A1 * | 3/2010 | Kilpatrick et al. | 345/650 |

* cited by examiner

*Primary Examiner* — Henry Tsai
*Assistant Examiner* — Dean Phan

(57) ABSTRACT

A metric-converter watch device comprising a small watch-shaped housing with a top dock panel pivotably attached to the housing. The clock panel has a front side with a functioning clock face and a back side with a back side screen. An inside touch screen is disposed within the housing. When the clock panel is flipped up, the back screen and the inside screen are powered on to show a calculator interface with the inside screen displaying a plurality of icons and the back screen displaying input numbers and results. A microprocessor is operatively connected to the inside touch screen and back side screen. The microprocessor is configured to perform mathematical operations and configured to convert a first English numeric value to a first metric numeric value and convert a second metric numeric value to a second English numeric value.

8 Claims, 3 Drawing Sheets

METRIC-CONVERTER WATCH DEVICE

CROSS REFERENCE

This application claims priority to U.S. Non-Provisional application Ser. No. 12/537,227 filed Aug. 6, 2009, the disclosure of which is incorporated herein by reference in its entirety.

FIELD OF THE INVENTION

The present invention is directed to a device for converting units such as converting metric units to English units and English units to metric units. More particularly, the present invention is directed to a watch comprising a calculator that is configured to convert units.

BACKGROUND OF THE INVENTION

Individuals may often find themselves in need of converting units from metric units to English units or vice versa. For example, travelers may need to convert units when traveling in a foreign country. Also, many scientists must change between metric and English units on a constant basis. The present invention features a metric-converter watch device with integrated function of a regular watch and a hidden calculator/unit converter.

Any feature or combination of features described herein are included within the scope of the present invention provided that the features included in any such combination are not mutually inconsistent as will be apparent from the context, this specification, and the knowledge of one of ordinary skill in the art. Additional advantages and aspects of the present invention are apparent in the following detailed description and claims.

SUMMARY OF THE INVENTION

A metric-converter watch device comprising a small watch-shaped housing with a top clock panel pivotably attached to the housing. The clock panel has a front side with a functioning clock face and a back side with a back side screen. An inside touch screen is disposed within the housing. When the clock panel is flipped up, the back screen and inside screen are powered on to shown a calculator interface with the inside screen displaying a plurality of icons and the back screen displaying input numbers and results. A microprocessor is operatively connected to the inside screen and touch screen. The microprocessor is configured to perform mathematical operations and configured to convert a first English numeric value to a first metric numeric value and convert a second metric numeric value to a second English numeric value.

DESCRIPTION OF PREFERRED EMBODIMENTS

Figure 1:
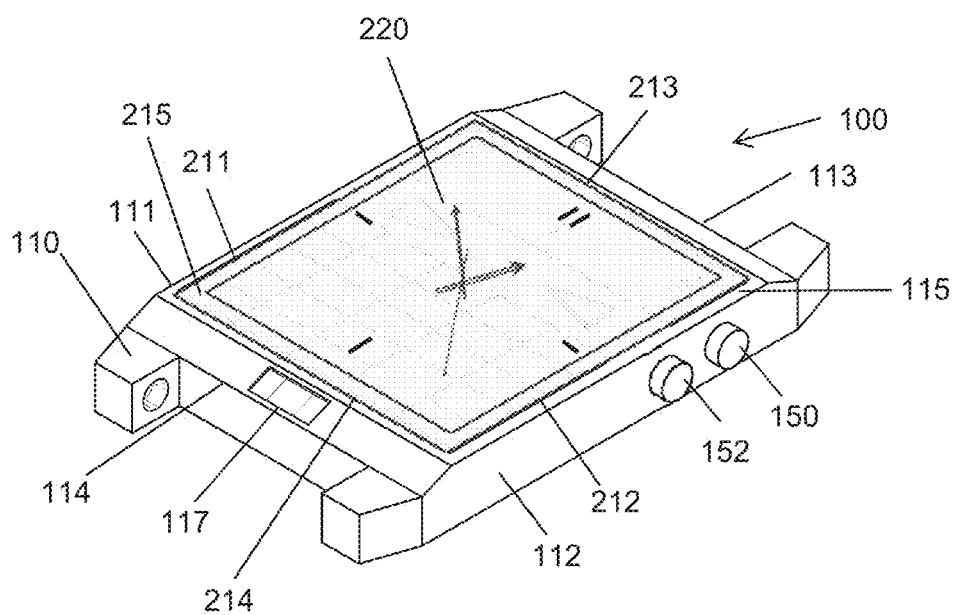
FIG. 1 is a top perspective view of the metric-converter watch device of the present invention.
Figure 2:
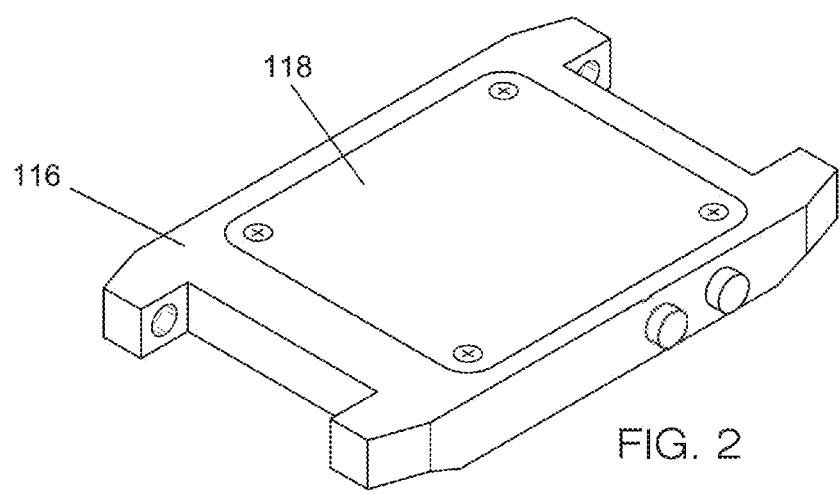
FIG. 2 is a bottom perspective view of the device of FIG. 1.
Figure 3:
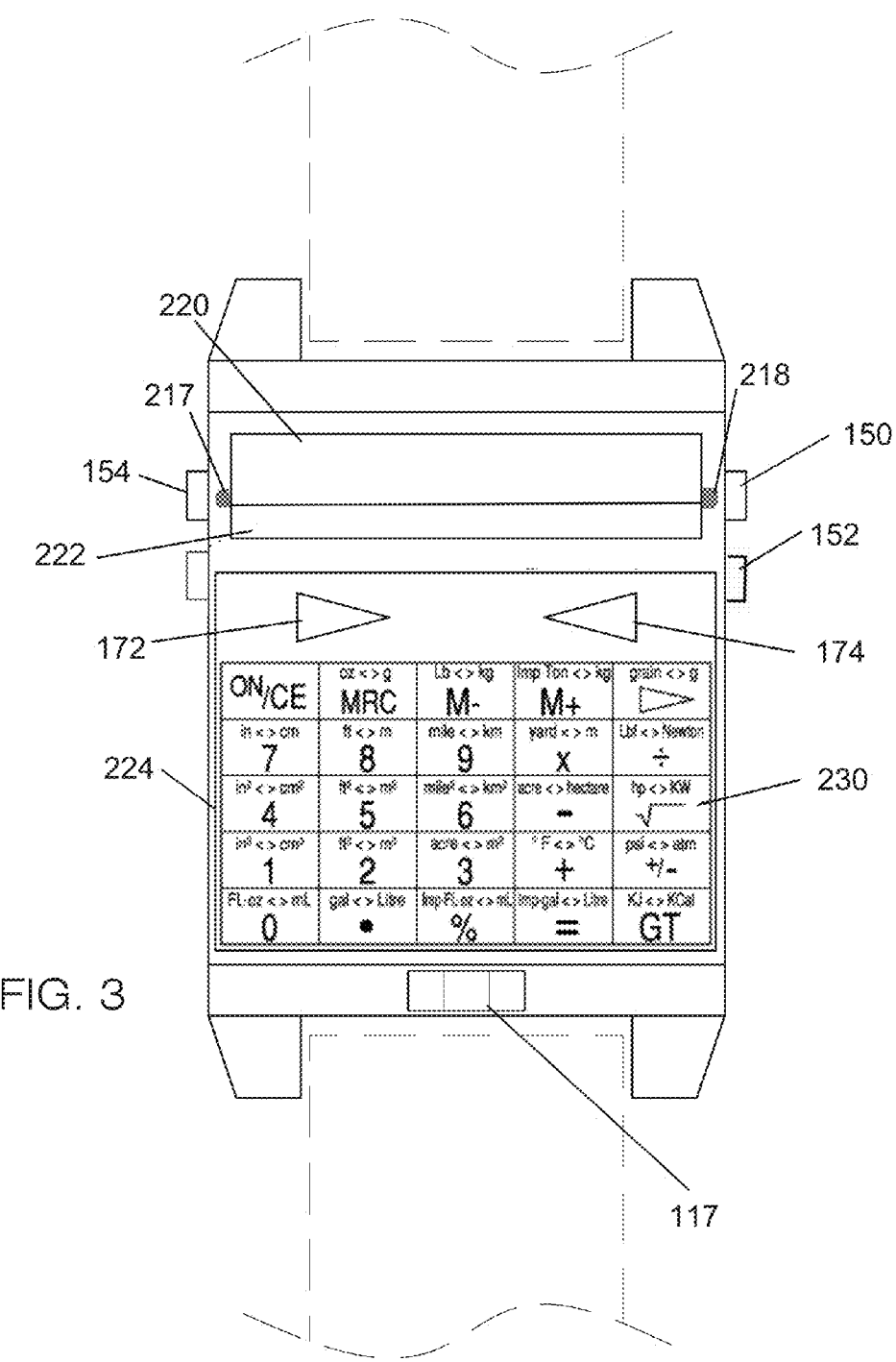
FIG. 3 is a top view of the device of FIG. 1 with the watch panel flipped up.

Following is a list of elements corresponding to a particular element referred to herein:

| | |
|---|---|
| 100 | a metric-converter watch device |
| 110 | watch housing |
| 111 | first side of the watch housing |
| 112 | second side of the watch housing |
| 113 | third side of the watch housing |
| 114 | fourth side of the watch housing |
| 115 | top surface of the watch housing |
| 116 | bottom surface of the watch housing |
| 117 | solar panel |
| 118 | battery compartment |
| 119 | cavity on the front surface of the watch housing |
| 150 | select icon |
| 152 | mode icon |
| 154 | power icon |
| 172 | first conversion icon |
| 174 | second conversion icon |
| 210 | watch panel |
| 211 | first side of the watch panel |
| 212 | second side of the watch panel |
| 213 | third side of the watch panel |
| 214 | fourth side of the watch panel |
| 215 | top side of the watch panel |
| 216 | back side of the watch panel |
| 217 | first hinge |
| 218 | second hinge |
| 220 | clock |
| 222 | back side screen |
| 224 | inside touch screen |
| 230 | touch screen keypad icons |
| 232 | microprocessor |
| 234 | battery |

Referring now to FIG. 1-5, the present invention features a metric-converter watch device (100) configured with a calculator that can convert units (e.g., metric units to English units, English units to metric units). The metric-converter watch device (100) comprises a watch housing (110), a watch panel (210) and an inside touch screen (224).

The watch housing may be shaped similar to a standard digital watch, well known to one of ordinary skill in the art. For example, the housing 110 may be appropriately small to be worn as a watch. The watch housing (110) may have a first side (111), a second side (112), a third side (113), a fourth side (114), a top surface (115), and a bottom surface (116); wherein a cavity (119) is disposed on the top surface (115); wherein a battery compartment (118) may be disposed in the bottom surface (116) of the housing (110), wherein a battery (234) is disposed in a battery compartment (118).

Figure 4:
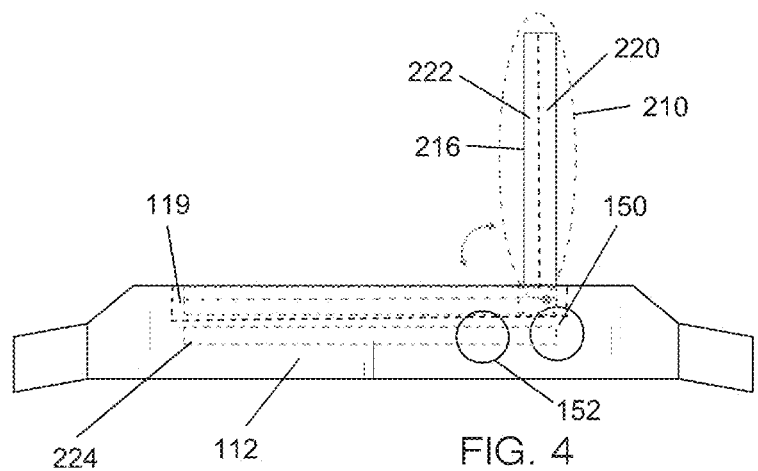
FIG. 4 is a side view of the device of FIG. 1 with the watch panel flipped up.
Figure 5:
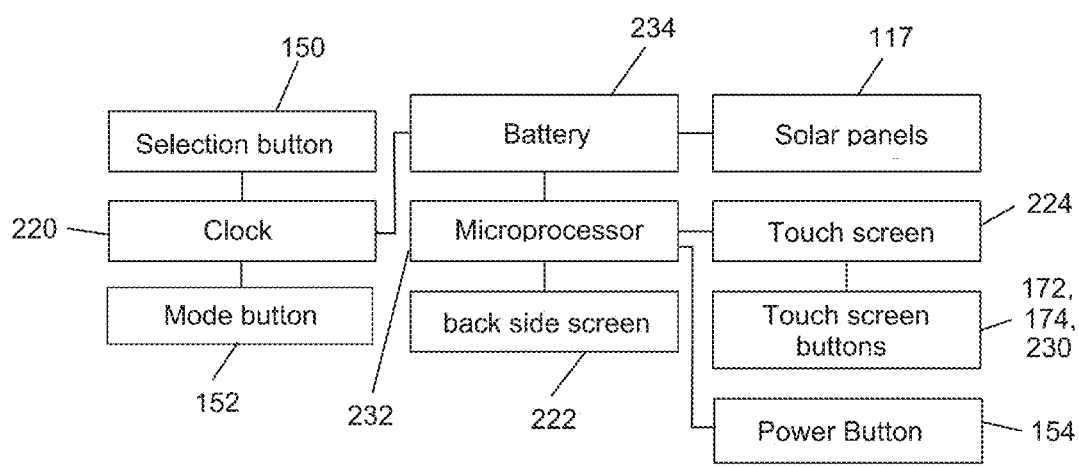
FIG. 5 is a schematic representation of the electrical components of the device of the present invention.

The watch panel (210) has a first side (211), a second side (212), a third side (213), a fourth side (214), a top side (215), and a back side (216), wherein the watch panel (210) is pivotably attached to the watch housing (110) such that the watch panel (210) is pivotably moveable between an open position and a closed position, as shown in FIG. 4. The watch panel (210) resides entirely within the cavity (119) at the closed position such that the top side of the watch panel (210) aligns with the top surface (115) of the watch housing; wherein a functioning clock (220) is disposed on the top side (215) of the watch panel (210) and a back side screen (222) is disposed on the back side (216) of the watch panel (210). In some embodiments, the top side of the watch panel (210) is on the same plane or is flushed with the top surface (115) of the watch housing. In some embodiments, the functioning clock (220) is digital or analogue.

The inside touch screen (224) is disposed within the cavity (119) of the watch housing (110), wherein the inside touch screen (224) faces the back side screen (222) when the watch panel (210) is at the closed position; wherein when the touch screen is powered on, a first conversion icon (172), a second conversion icon (174) and a plurality of touch screen keypad icons (230) are displayed on the touch screen.

A microprocessor is disposed within the watch housing (110), wherein the microprocessor (232) is operatively connected to the battery (234), the back side screen (222), the touch screen (224); wherein when screen (224) outputs when the first conversion icon (172), the second conversion icon (174) or the touch screen keypad icons (230) are pressed, the touch screen (224) generates corresponding input signals and sends the input signals to the microprocessor (232).

The microprocessor is configured to perform mathematical operations and configured to convert a first English numeric value to a first metric numeric value and convert a second metric numeric value to a second English numeric value.

The microprocessor is configured to receive a first numeric value input from the touch screen when one or more keypad icons (230) are depressed, subsequently generate a first output command to the back side panel (222) to display the first numeric value on the back side panel as a first English numeric value; subsequently receive a first input signal from touch screen (224) when the first conversion icon (172) is depressed, subsequently calculate a first metric numeric value by multiplying the first English numeric value by a first conversion factor, and the microprocessor then generates a second output command to the back side screen (222) to display the first metric numeric value.

The microprocessor is configured to receive a second numeric value input from the touch screen when one or more keypad icons (230) are depressed, subsequently generate a third output command to the back side panel (222) to display the second numeric value on the back side panel as a second metric numeric value; subsequently receive a second input signal from touch screen (224) when the second conversion icon (174) is depressed, subsequently calculate the second English numeric value by multiplying the second metric numeric value by a second conversion factor, and the microprocessor then generates a fourth output command to the back side screen (222) to display the second English numeric value.

The back side screen and the inside touch screen offer a distinct advantage of relatively large screens for better visual identification of the touch screen icons and input/output display.

In some embodiments, the watch panel (210) is pivotably attached to the watch housing (110) via a first pivot hinge (217) and a second pivot hinge (218). The first pivot hinge (217) is disposed on the first side (211) of the watch panel and the second pivot (218) is disposed on the second side (212) of the watch panel.

In some embodiments, the watch device further comprises a solar panel (117) disposed on the front surface (111) of the watch housing (110), wherein the solar panel (117) is operatively connected to the batter (234) and configured to charge the battery.

In some embodiments, the clock (220) is a digital clock on a screen, operatively connected to and powered by the battery (234). In some embodiments, the clock (220) is a digital clock on a screen with its own power source. In some embodiments, the watch device (100) further comprises a selection icon (150) and a mode icon (152) disposed on the second side (112) of the watch housing (110), wherein the selection icon (150) and the mode icon (152) are operatively connected to clock (220). The selection icon (150) and the mode icon (152) are configured to adjust the clock (220). Selection icon and the mode icon of a watch are well known to one of ordinary skill in the art. Other features of the clock (220) may include: automatic power off, backlight with afterglow, world time tables, daylight savings time modifications, calendars, 12-hour or 24-hour format for time, waterproof, countdown timer, and the like.

In some embodiments, the clock (220) is a quartz clock, wherein the clock (220) is operatively connected to and powered by the battery (234). In some embodiments, the clock (220) is a quartz clock with its own power source. In some embodiments, the clock (220) is a mechanic clock powered by spring or kinetic movement.

In some embodiments, the back side screen (222) and the touch screen (224) are turned on automatically when the watch panel (210) is at the open position, wherein the back side screen (222) and the touch screen (224) are turned off automatically when the watch panel (210) is at the closed position. In some embodiments, a power icon (176) is disposed on the first side (111) of the watch housing (110), wherein the power icon (154) is operatively connected to the microprocessor and configured to turn on back side screen (222) and the touch screen (224) when the power icon (154) is depressed.

In some embodiments, the numeric keypad (230) comprises a variety of keypad icons (see FIG. 3) many of which may be similar to standard keypad icons on watches and calculators. In some embodiments, the keypad icons include "MRC" for total memory recall/clear (to recall total memory press MRC once and to clear memory press MRC twice), "M+" for memory plus, "M−" for memory minus, "ON/CE" to turn on the calculator and/or to clear all entries, " "▷" " for correction, numerical keys such as "0", "1", "2", "3", etc., "GT" for grand total, "%" for percent, "+" for addition, "−" for subtraction, "x" for multiplication, "÷" for division, "+/−" for positive and negative, "√" for square roots, "." for decimals, and/or "=" for equals.

The microprocessor (232) is also configured to convert a numeric value from a metric unit to an English unit or an English unit to a metric unit. Programs of this nature for microprocessors are well known to one of ordinary skill in the art. For example, a first numerical value may be multiplied by a conversion factor to calculate a first resulting value. Table 1 lists several conversion factors. The present invention is not limited to the values and conversion factors in Table 1.

TABLE 1

| Numerical Value | Conversion Factor | Resulting Value |
|---|---|---|
| in | 2.5400005 | cm |
| cm | 0.3937007 | in |
| ft | 0.3048 | m |
| m | 3.2808398 | ft |
| mi | 1.6093002 | km |
| km | 0.6213881 | mi |
| yd | 0.9144 | m |
| m | 1.0936132 | yd |
| $in^2$ | 6.4516004 | $cm^2$ |
| $cm^2$ | 0.1550003 | $in^2$ |
| $ft^2$ | 0.0929 | $m^2$ |
| $m^2$ | 10.764262 | $ft^2$ |
| $mi^2$ | 2.5898 | $km^2$ |
| $km^2$ | 0.3861302 | $mi^2$ |
| acre | 0.4046944 | hectare |
| hectare | 2.4710003 | acre |
| acre | 4046.9445 | $m^2$ |
| $m^2$ | 0.0002471 | acre |
| $in^3$ | 16.387022 | $cm^3$ |

TABLE 1-continued

| Numerical Value | Conversion Factor | Resulting Value |
|---|---|---|
| $cm^3$ | 0.0610239 | $in^3$ |
| $ft^3$ | 0.028317 | $m^3$ |
| $m^3$ | 35.314475 | $ft^3$ |
| Fl oz | 29.574074 | ml |
| ml | 0.0338134 | Fl oz |
| gal | 3.785401 | liter |
| liter | 0.2641728 | gal |
| Imp fl oz | 28.410059 | ml |
| ml | 0.0351988 | Imp fl oz |
| Imp. Gallon | 4.546 | Liter |
| Liter | 0.2199736 | Imp. Gallon |
| Ounce | 28.350055 | Gallon |
| Gallon | 0.0352733 | Ounce |
| Pound | 0.4536 | Kilogram |
| Kilogram | 2.2045855 | Pound |
| Imp. Ton | 1016.0536 | Kilogram |
| Kilogram | 0.0009842 | Imp. Ton |
| Grain | 0.0647987 | Gram |
| Gram | 15.4324 | Grain |
| Lbf | 4.4482204 | Newton |
| Newton | 0.224809 | Lbf |
| Hp | 0.7354996 | Kw |
| Kw | 1.35962 | Hp |
| Psi | 0.0680459 | Atm |
| Atm | 14.69595 | Psi |
| Kj | 0.238846 | Kcal |
| Kcal | 4.1867981 | Kj |
| Fahrenheit | (x − 32)/1.8 | Celsius |
| Celsius | 1.8x + 32 | Fahrenheit |

In some embodiments, the housing (110) is between about 25 to 30 mm in width as measured from the first side (111) to the second side (112). In some embodiments, the housing (110) is between about 30 to 35 mm in width as measured from the first side (111) to the second side (112).

In some embodiments, the housing (110) is between about 35 to 45 mm in length as measured from the third side (113) to the fourth side (114). In some embodiments, the housing (110) is between about 45 to 55 mm in length as measured from the third side (113) to the fourth side (114).

As used herein, the term "about" refers to plus or minus 10% of the referenced number. For example, an embodiment wherein the watch housing (110) is about 30 mm in width includes a watch housing (110) that is between 27 and 33 mm in width.

The following the disclosures of the following U.S. Patents are incorporated in their entirety by reference herein: U.S. Pat. No. 4,109,315; U.S. Pat. No. 4,141,074; U.S. Pat. No. 4,158,285; U.S. Pat. No. 4,093,992; U.S. Pat. No. 5,265,009. U.S. Pat. No. 4,041,295; U.S. Pat. No. 4,228,516.

Various modifications of the invention, in addition to those described herein, will be apparent to those skilled in the art from the foregoing description. Such modifications are also intended to fall within the scope of the appended claims. Each reference cited in the present application is incorporated herein by reference in its entirety.

Although there has been shown and described the preferred embodiment of the present invention, it will be readily apparent to those skilled in the art that modifications may be made thereto which do not exceed the scope of the appended claims. Therefore, the scope of the invention is only to be limited by the following claims.

What is claimed is:

1. A metric-converter watch device comprising:
   (a) a watch housing having a first side, a second side, a third side, a fourth side, a top surface, and a bottom surface; wherein a cavity is disposed on the top surface; wherein a battery compartment may be disposed in the bottom surface of the housing, wherein a battery is disposed in a battery compartment; and
   (b) a watch panel having a first side, a second side, a third side, a fourth side, a top side, and a back side, wherein the watch panel is pivotably attached to the watch housing such that the watch panel is pivotably moveable between an open position and a closed position, wherein the watch panel resides entirely within the cavity at the closed position such that the top side of the watch panel aligns with the top surface of the watch housing; wherein a functioning clock is disposed on the top side of the watch panel and a back side screen is disposed on the back side of the watch panel;
   (c) an inside touch screen disposed within the cavity of the watch housing, wherein the inside touch screen faces the back side screen when the watch panel is at the closed position; wherein when the touch screen is powered on, a first conversion icon, a second conversion icon and a plurality of touch screen keypad icons are displayed on the touch screen;
   (d) a microprocessor disposed within the watch housing, wherein the microprocessor is operatively connected to the battery, the back side screen, the touch screen; wherein when the first conversion icon, the second conversion icon or the touch screen keypad icons are pressed, the touch screen generates corresponding input signals and sends the input signals to the microprocessor;
   wherein the microprocessor is configured to perform mathematical operations and configured to convert a first English numeric value to a first metric numeric value and convert a second metric numeric value to a second English numeric value, wherein the microprocessor is configured to:
   receive a first numeric value input from the touch screen when one or more keypad icons are depressed, subsequently generate a first output command to the back side panel to display the first numeric value on the back side panel as a first English numeric value; subsequently receive a first input signal from touch screen when the first conversion icon is depressed, subsequently calculate a first metric numeric value by multiplying the first English numeric value by a first conversion factor, and the microprocessor then generates a second output command to the back side screen to display the first metric numeric value; and
   receive a second numeric value input from the touch screen when one or more keypad icons are depressed, subsequently generate a third output command to the back side panel to display the second numeric value on the back side panel as a second metric numeric value; subsequently receive a second input signal from touch screen when the second conversion icon is depressed, subsequently calculate the second English numeric value by multiplying the second metric numeric value by a second conversion factor, and the microprocessor then generates a fourth output command to the back side screen to display the second English numeric value.

2. The metric-converter watch device of claim 1, wherein the watch device further comprises a solar panel disposed on the front surface of the watch housing, wherein the solar panel is operatively connected to the batter and configured to charge the battery.

3. The metric-converter watch device of claim 1, wherein the clock is a digital clock on a screen.

4. The metric-converter watch device of claim 3, wherein the watch device further comprises a selection icon and a mode icon disposed on the second side of the watch housing, wherein the selection icon and the mode icon are operatively connected to clock and are configured to adjust the clock.

5. The metric-converter watch device of claim 1, wherein the clock is a quartz clock.

6. The metric-converter watch device of claim 1, wherein the back side screen and the touch screen are turned on automatically when the watch panel is at the open position, wherein the back side screen and the touch screen are turned off automatically when the watch panel is at the closed position.

7. The metric-converter watch device of claim 1, wherein a power icon is disposed on the first side of the watch housing, wherein the power icon is operatively connected to the microprocessor and configured to turn on back side screen and the touch screen when the power icon is depressed.

8. A metric-converter watch device consisting of:
(a) a watch housing having a first side, a second side, a third side, a fourth side, a top surface, and a bottom surface; wherein a cavity is disposed on the top surface; wherein a battery compartment may be disposed in the bottom surface of the housing, wherein a battery is disposed in a battery compartment; and
(b) a watch panel having a first side, a second side, a third side, a fourth side, a top side, and a back side, wherein the watch panel is pivotably attached to the watch housing such that the watch panel is pivotably moveable between an open position and a closed position, wherein the watch panel resides entirely within the cavity at the closed position such that the top side of the watch panel aligns with the top surface of the watch housing;
wherein a functioning clock is disposed on the top side of the watch panel and a back side screen is disposed on the back side of the watch panel, wherein the clock consists of its own power source;
(c) an inside touch screen disposed within the cavity of the watch housing, wherein the inside touch screen faces the back side screen when the watch panel is at the closed position; wherein when the touch screen is powered on, a first conversion icon, a second conversion icon and a plurality of touch screen keypad icons are displayed on the touch screen;
(d) a microprocessor disposed within the watch housing, wherein the microprocessor is operatively connected to the battery, the back side screen, the touch screen; wherein when the first conversion icon, the second conversion icon or the touch screen keypad icons are pressed, the touch screen generates corresponding input signals and sends the input signals to the microprocessor;
wherein the microprocessor is configured to perform mathematical operations and configured to convert a first English numeric value to a first metric numeric value and convert a second metric numeric value to a second English numeric value, wherein the microprocessor is configured to:
receive a first numeric value input from the touch screen when one or more keypad icons are depressed, subsequently generate a first output command to the back side panel to display the first numeric value on the back side panel as a first English numeric value; subsequently receive a first input signal from touch screen when the first conversion icon is depressed, subsequently calculate a first metric numeric value by multiplying the first English numeric value by a first conversion factor, and the microprocessor then generates a second output command to the back side screen to display the first metric numeric value; and
receive a second numeric value input from the touch screen when one or more keypad icons are depressed, subsequently generate a third output command to the back side panel to display the second numeric value on the back side panel as a second metric numeric value; subsequently receive a second input signal from touch screen when the second conversion icon is depressed, subsequently calculate the second English numeric value by multiplying the second metric numeric value by a second conversion factor, and the microprocessor then generates a fourth output command to the back side screen to display the second English numeric value.

* * * * *